(12) United States Patent
Chakkaravarthy et al.

(10) Patent No.: US 11,550,867 B1
(45) Date of Patent: Jan. 10, 2023

(54) APPARATUS AND METHODS FOR BOOKMARK SHARING

(71) Applicant: Bank of America Corporation, Charlotte, NC (US)

(72) Inventors: Aravind Mangadu Chakkaravarthy, Charlotte, NC (US); Chris Welles, Charlotte, NC (US); David Ovitsky, Brooklyn, NY (US); Dawn A. Buhl-Rivelli, Hazlet, NJ (US); Erica Grunfeld, Charlotte, NC (US); Andrew Dennis, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/469,943

(22) Filed: Sep. 9, 2021

(51) Int. Cl.
| | |
|---|---|
| *H04L 29/08* | (2006.01) |
| *H04L 29/06* | (2006.01) |
| *G06F 16/955* | (2019.01) |
| *G06F 16/9532* | (2019.01) |
| *G06N 20/00* | (2019.01) |
| *H04L 67/10* | (2022.01) |
| *G06F 16/907* | (2019.01) |
| *H04L 51/02* | (2022.01) |

(52) U.S. Cl.
CPC ........ *G06F 16/9562* (2019.01); *G06F 16/907* (2019.01); *G06F 16/9532* (2019.01); *G06N 20/00* (2019.01); *H04L 51/02* (2013.01); *H04L 67/10* (2013.01)

(58) Field of Classification Search
CPC ............. G06F 16/9562; G06F 16/9532; G06F 16/907; H04L 67/10; H04L 51/02; G06N 20/00

USPC ........................................................ 709/217
See application file for complete search history.

(56) References Cited

U.S. PATENT DOCUMENTS

| | | | | |
|---|---|---|---|---|
| 8,239,367 B1 * | 8/2012 | Zamir | ................ | G06F 16/9562 707/710 |
| 8,548,991 B1 * | 10/2013 | Zamir | ................ | G06F 16/9535 707/723 |
| 8,761,392 B2 * | 6/2014 | Chen | ................ | H04N 21/8586 713/193 |
| 2005/0210145 A1 * | 9/2005 | Kim | ................ | H04N 21/4788 709/219 |
| 2008/0010286 A1 * | 1/2008 | Zhang | ................ | G06F 16/9562 |
| 2008/0086471 A1 * | 4/2008 | Ritter | ................ | G06F 16/9562 |

(Continued)

FOREIGN PATENT DOCUMENTS

| | | | | | |
|---|---|---|---|---|---|
| KR | 20120105583 A | * | 9/2012 | ........... | H04L 9/3213 |
| WO | WO-2008103364 A1 | * | 8/2008 | ........... | G11B 27/105 |

*Primary Examiner* — Ruolei Zong
(74) *Attorney, Agent, or Firm* — Weiss & Arons LLP

(57) ABSTRACT

Apparatus and methods for sharing bookmarks are provided. Bookmarks may include queries to a chatbot or other interactive application. A server may include a shared bookmark controller and a personal computing device may include a user bookmark controller. A user may save a bookmark and share the bookmark with a chosen recipient. The user bookmark controller may send the bookmark and the identity of the recipient to the shared bookmark controller. The shared bookmark controller may then send the bookmark to the recipient and record whether the recipient saves or rejects the bookmark. Bookmarks may be collated and categorized into groups, and entire groups may be shared.

17 Claims, 6 Drawing Sheets

(56) References Cited

U.S. PATENT DOCUMENTS

| | | | |
|---|---|---|---|
| 2013/0230248 A1* | 9/2013 | Alexander | G06F 16/9562 709/205 |
| 2014/0125593 A1* | 5/2014 | Li | G06F 3/04883 345/158 |
| 2015/0081783 A1* | 3/2015 | Gong | H04L 65/60 709/204 |
| 2018/0090135 A1* | 3/2018 | Schlesinger | G10L 15/22 |
| 2019/0110856 A1* | 4/2019 | Barral | G16H 30/40 |
| 2022/0215065 A1* | 7/2022 | Shetty | G06N 20/00 |

* cited by examiner

US 11,550,867 B1

APPARATUS AND METHODS FOR BOOKMARK SHARING

FIELD OF TECHNOLOGY

Aspects of the disclosure relate to providing apparatus and methods for sharing bookmarks among users of a particular software application.

BACKGROUND OF THE DISCLOSURE

Consumers, customers, employees and other users interact and use chatbots and other interactive software applications billions of times per day. These interactions may take place online/in the cloud or in an internal intranet. Atypical interaction may be a query to a chatbot, along with the response to the query. Many interactions/queries may be repetitive. Saving repetitive interactions as bookmarks may save time and increase productivity.

Sharing repetitive interactions as bookmarks may also save time and increase productivity of employees, as well as increase customer/consumer contentment. Call center agents may share bookmarks with customers. IT professionals and HR professionals may share bookmarks with employees. Employees may share bookmarks with each other.

Supervisors/managers may share bookmarks with subordinates for training or help. Current applications may not permit seamless and easy sharing of the bookmarks.

Therefore, it would be desirable for apparatus and methods for sharing bookmarks among users of particular software applications.

SUMMARY OF THE DISCLOSURE

It is an object of this disclosure to provide apparatus and methods for sharing bookmarks among users of a particular software application.

An apparatus for sharing bookmarks is provided. The apparatus may include a server and a personal computing device. The server may be centralized or distributed. The server may include a server communication link, a server processor, and a server non-transitory memory. The server non-transitory memory may be configured to store, inter alia, a server operating system, one or more bookmarks, and a shared bookmark controller.

The shared bookmark controller may run on the server processor. The shared bookmark controller may be configured to store the bookmarks, add metadata to the stored bookmarks, send the bookmarks to a recipient, and record when the recipient saves the bookmarks.

The personal computing device may include a device communication link, a device processor, and a device non-transitory memory. The device non-transitory memory may be configured to store, inter alia, a device operating system and a user bookmark controller.

The user bookmark controller may run on the device processor and may be configured to permit a user of the personal computing device to save bookmarks to the device non-transitory memory. The user bookmark controller may be configured to permit the user to select any saved bookmark and share the selected bookmark with the shared bookmark controller. The user bookmark controller may permit the user to select the recipient (or recipients) for the shared bookmark(s).

A bookmark may include a query to a chatbot. A bookmark may be formed when the user selects a response to the query from the chatbot.

In an embodiment, the user bookmark controller may permit the user to categorize the bookmark(s) into discrete collections and categories.

In an embodiment, the user bookmark controller may permit the user to share the categories including one or more bookmarks, instead of sharing each bookmark directly.

In an embodiment, each bookmark may include the chatbot's response to the query, in addition to the query itself.

In an embodiment, the query to the chatbot may be an audio query, which may be converted to text through any suitable audio-to-text converter.

In an embodiment, the user bookmark controller may be configured to provide a predictive search function to the user. The predictive search function may be linked to a directory including all possible recipients.

In an embodiment, the user bookmark controller may be configured to insert a graphical user interface into the chatbot.

In an embodiment, the metadata may include the identity of the user, the time when the user created the bookmarks, the location where the user created the bookmarks, a title for the bookmarks or bookmark category, and a category for the bookmarks.

A method for sharing bookmarks is provided. The method may include storing bookmarks at a user bookmark controller. The bookmarks may include queries to a chatbot. The method may include receiving, from a user, a selection of one or more of the stored bookmarks. The method may include receiving, from the user, an identification of one or more recipients for the selected bookmarks. The method may include then sending the bookmarks and the identities of the recipients to a shared bookmark controller. The method may include sending the bookmarks from the shared bookmark controller to the recipients, and then recording if and when the recipient saves the bookmarks.

In an embodiment, the method may include categorizing the bookmarks at the user bookmark controller.

In an embodiment, the method may include the shared data controller adding metadata to the bookmarks. The metadata may include the identity of the user, the time when the user created the bookmarks, the location where the user created the bookmarks, a title for the bookmarks or bookmark category, and a category for the bookmarks In an embodiment, the bookmarks may be formed at the user bookmark controller by selecting a response to the query from the chatbot, instead of selecting the query to the chatbot.

In an embodiment, the method may include the shared bookmark controller recording when the recipients reject the one or more bookmarks, and sending a notification of the rejection or save to the user bookmark controller.

In an embodiment, the user bookmark controller may be located at a location that is remote from the server/shared bookmark controller.

A method of sharing bookmarks is provided. The method may include storing a plurality of bookmarks, at a database. Each bookmark may include queries to a chatbot regarding different topics and roles. The method may include monitoring a user's queries to the chatbot. When two or more of the user's queries to the chatbot are regarding a single topic, the method may include identifying bookmark(s) corresponding to that single topic, and sending the stored bookmarks corresponding to that single topic to the user. When the user is assigned a role from the available roles, the method may include identifying stored bookmark(s) corresponding to the role, and sending the stored bookmarks corresponding to the role to the user. In an embodiment, the steps of monitoring, identifying, and sending are performed by a shared bookmark controller running on a processor included in a server.

In an embodiment, the stored bookmarks corresponding to the single topic may be sent to a graphical user interface included with the chatbot.

In an embodiment, the shared bookmark controller may include an artificial intelligence/machine ("AI/ML") learning algorithm.

In an embodiment, the method may include collating the stored bookmarks corresponding to the single topic into a collection and sending the entire collection to the user, instead of single bookmarks.

In an embodiment, the method may include collating the stored bookmarks corresponding to the role into a collection and sending the collection to the user, instead of single bookmarks.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
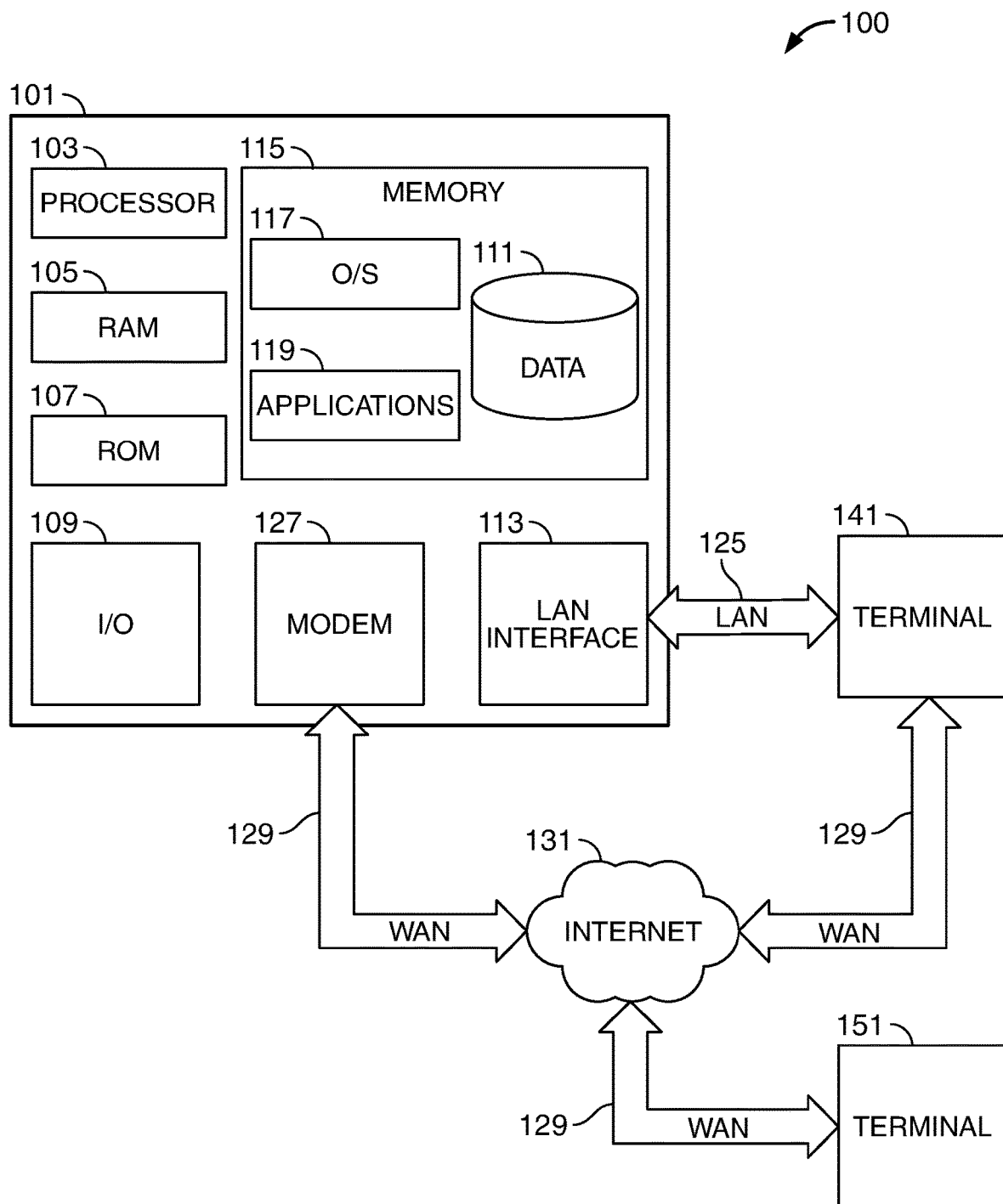
FIG. 1 shows an illustrative apparatus in accordance with principles of the disclosure.

It is an object of this disclosure to provide apparatus and for sharing bookmarks among users of a particular software application.

In this disclosure, bookmarks may consist of queries to a chatbot or other software application. For example, a user may ask a chatbot, "What are today's 30-year fixed mortgage interest rates?" That query may elicit a response from the chatbot. The user may be able to save that query as a 'bookmark' so the user can ask the same thing the next day, or at any point in the future, without having to retype the same query. It is an object of this disclosure to provide apparatus and methods whereby the user can share the bookmark(s) the user has saved with other users.

An apparatus for sharing bookmarks is provided. The apparatus may include a server and a personal computing device, such as, inter alia, a personal computer, tablet, mobile phone, or laptop.

The server may be centralized or distributed. Centralized and distributed servers may have different advantages and disadvantages over each other. For example, a centralized server may be cheaper, but a distributed server setup may be more powerful. Centralized servers may increase repairability and decrease cost. In other embodiments, distributed servers may decrease costs and increase security and uptime.

The server may include a server communication link, a server processor, a server non-transitory memory, and an input/output module, among other items.

The server may utilize the communication link to communicate, over a network, with user bookmark controllers. Any appropriate communication link may be used. The communication link may include any necessary hardware (e.g., antennae) and software to control the link. In an embodiment, the network may be the Internet. In another embodiment, the network may be an internal intranet. For example, if a company uses particular internal software applications/chatbots, the apparatus may interact only within the company's intranet without access to the Internet.

The server may include one or more processors and non-transitory memory. The processors may be microprocessors. More processing power and memory may increase the functionality of the apparatus by allowing for more robust communication, analysis and computation, and increasing the amount of data storage for the controllers and any AI/ML algorithm(s) to utilize for training and analysis. The non-transitory memory of the server and the personal computing device may each store a respective operating system as well as a respective bookmark controller. The non-transitory memory may also store other applications as well as data, as necessary. The applications, including the operating system and the bookmark controllers may run on the processor(s).

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The processor(s) may control the operation of the apparatus and its components, which may include RAM, ROM, an input/output module, and other memory. The microprocessor may also execute all software running on the apparatus—e.g., the operating system and any applications such as the bookmark controllers and any security protocols. Other components commonly used for computers, such as EEPROM or Flash memory or any other suitable components, may also be part of the apparatus.

The network connections/communication link may include a local area network (LAN) and a wide area network (WAN or the Internet), and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology e.g., a hard drive or other non-transitory memory. The memory may store software including an operating system and any application(s) (such as the bookmark controllers) along with any data needed for the operation of the apparatus and to share bookmarks. The data may also be stored in cache memory, or any other suitable memory. Alternatively, some or all of computer executable instructions (alternatively referred to as "code") may be embodied in hardware or firmware.

An input/output ("I/O") module may include connectivity to a keyboard, monitor, or network interface through which a user may provide input. The input may include input relating to cursor movement. The input/output module may also include one or more speakers for providing audio output and a video display device, such as an LED screen and/or touchscreen, for providing textual, audio, audiovisual, and/or graphical output.

The server non-transitory memory may be configured to store, inter alia, a server operating system, one or more bookmarks, and a shared bookmark controller.

The shared bookmark controller may run on the server processor. The shared bookmark controller may be configured to store any bookmarks saved and shared by a user, add metadata to the stored bookmarks, send the bookmarks to recipient(s) (i.e., share the bookmarks), and record when the recipient saves the bookmarks or rejects the bookmarks. The shared bookmark controller may notify the user who shared the bookmark(s) whether the recipient saved or rejected the bookmark.

In an embodiment, the metadata may include the identity of the user, the time when the user created the bookmarks, the location where the user created the bookmarks, a title for the bookmarks or bookmark category, and a category for the bookmarks. Other metadata may be added as well.

The personal computing device may include a device communication link, a device processor, and a device non-transitory memory. The device non-transitory memory may be configured to store, inter alia, a device operating system and a user bookmark controller. The personal computing device may communicate with the server over the communication link.

The user bookmark controller may run on the device processor and may be configured to permit a user of the personal computing device to save bookmarks to the device non-transitory memory. While interacting with a software application, such as a chatbot or other interactive application, the user may perform an action (e.g., submit a query). The user may save the action as a bookmark. In an embodiment, the interactive application may include a graphical user interface element the user may select to save the bookmark. Any standard icon may be used, or a bespoke icon may be used. In an embodiment, the bookmark may be saved as, e.g., the query submitted by the user, or the sequence of keystrokes the user used to perform a particular action. In an embodiment, the bookmark may be named by the user. In an embodiment, the default name of the bookmark may be the actual query or sequence of keystrokes. For example, if the query submitted was "How do I do X?", the bookmark's default name will be "How do I do X?".

In an embodiment, the saved bookmark will appear in a list of bookmarks saved by the user. The list may be operated and controlled by the user bookmark controller. The list may appear next to an interactive application, in a separate window, or in the same window as the interactive application. For example, if the interactive application is a chatbot, the right side of the screen or window may be the chatbot, while the left side of the screen or window may be a list of saved bookmarks. In an embodiment, the list of saved bookmarks may include a list of shared bookmarks, with an indication as to whether the shared bookmarks have been saved or rejected. In an embodiment, the list of saved bookmarks may include a list of collections of collated bookmarks. In an embodiment, the list may include drop-down lists in order to make the list compact and more visible.

In and embodiment, the saved bookmark will be transferred to a user bookmark database. In an embodiment, this database may be located on the personal computing device. In another embodiment, the database may be on a server remote from the personal computing device.

The user bookmark controller may be configured to permit the user to select any saved bookmark and to share the selected bookmark with the shared bookmark controller. In an embodiment, the user may select the saved bookmark from the list of saved bookmarks available to the user.

The user bookmark controller may permit the user to select the recipient (or recipients) for the shared bookmark (s). For example, the user may select the bookmark or bookmarks to share by clicking a particular 'share' icon or other interactive element. A dialog box may appear and prompt the user to insert a recipient name and/or email to share the bookmark(s) with. In an embodiment, the dialog box may include a predictive search function to help the user input a recipient name or email address. In an embodiment, the user bookmark controller may be configured to provide a predictive search function to the user. The predictive search function may be linked to a directory including all possible recipients.

In an embodiment, each user bookmark controller may have the ability to share a bookmark directly with another user bookmark controller, bypassing the server and shared bookmark controller. In an embodiment, the user bookmark controller may operate as a peer-to-peer ("P2P") node, and there may be no shared bookmark controller.

A bookmark may include a query to a chatbot. In an embodiment, the bookmark may be saved by selecting an icon on the graphical appearance of the query. In an embodiment, a bookmark may be formed when the user selects a response to the query from the chatbot instead of the query. Any response from the chatbot may include an icon or other selectable/interactive element the user can click. When the user selects the save or share icon, a bookmark may be created. In an embodiment, the bookmark may include the query. In another embodiment, the bookmark may include the chatbot's response in addition to or in place of the query. As the responses may change over time, saving the responses as a bookmark may not be as useful as saving the queries. In an embodiment, each bookmark may include the chatbot's response to the query, in addition to or in lieu of the query itself.

In an embodiment, once a bookmark is opened (or selected), the query or keystrokes may be submitted in the appropriate place. For example, if the bookmark is a query to a particular chatbot, once the bookmark is opened, the query may sent to the chatbot for the chatbot's current answer or reply.

In an embodiment, the user bookmark controller may permit the user to categorize the bookmark(s) into discrete collections and categories. This may help the user organize a voluminous amount of bookmarks for easy access and sharing. It is anticipated that a user may increase the number of saved bookmarks over time, and an ability to collate and categorize the bookmarks may help the user stay organized, increasing productivity.

In an embodiment, the user bookmark controller may permit the user to share the categories of collated bookmarks, instead of sharing each bookmark directly. This may enable a user to share multiple related bookmarks at one time, instead of individually.

In an embodiment, the query to the chatbot may be an audio query, which may be converted to text through any suitable audio-to-text converter. Other interactive inputs may also be saved as a bookmark in various embodiments. The most common, and easiest bookmark, to save may be a text query/input.

In an embodiment, the user bookmark controller may include its own graphical user interface and may be configured to insert its graphical user interface into the chatbot for ease of access and use. In an embodiment, the user bookmark controller may be a completely separate program that may have to be accessed separately from whatever application the user is saving bookmarks for (such as a chatbot). Implementing the bookmark controller into the application directly may increase productivity.

A method for sharing bookmarks is provided. The method may include storing bookmarks at a user bookmark controller. The bookmarks may include queries to a chatbot or other interactions with a software program (such as a search query or particular action). The bookmarks may be generated by a user.

The method may include the user selecting a stored bookmark or bookmarks, along with the user identifying one or more recipients for the selected bookmark(s), through the user bookmark controller. The selection and recipients may be sent to and received at a shared bookmark controller. The shared bookmark controller may be on a server. The server may be centralized or distributed. The method may include the shared bookmark controller sending the bookmark(s) to the recipient(s) identified by the user. The shared bookmark controller may record if and when the recipient saves the bookmarks, or if and when the recipient(s) reject the bookmarks. In an embodiment, the shared bookmark controller may inform and notify the user who shared the bookmark(s) if and when the recipient(s) saves or rejects the bookmarks. The sharing and notification may be an email, an instant message, a voicemail, or any other suitable method of notification.

In an embodiment, the method may include categorizing the bookmarks at the user bookmark controller. The user may categorize the bookmarks however is convenient for the user. The only limitation may be the size of the memory available in the database storing the user's bookmarks, along with a character limit. The character limit may be defined by the application, operating system, or hardware.

In an embodiment, the method may include the shared data controller adding metadata to the bookmarks. The metadata may include the identity of the user, the time when the user created the bookmarks, the location where the user created the bookmarks, a title for the bookmarks or bookmark category, and a category for the bookmarks. Other metadata may be added as well. In an embodiment, the shared bookmark controller may add some but not all of the metadata.

In an embodiment, the user bookmark controller may add the metadata instead of the shared bookmark controller.

In an embodiment, the bookmarks may be formed at the user bookmark controller by selecting a response to the query from the chatbot, instead of selecting the query to the chatbot. For example, if a user presented a query or search to the chatbot, and likes the chatbot's answer, the user may select the response. In an embodiment, selecting the response will save the query as the bookmark, as the responses may change over time. In an embodiment, selecting the response will save the query and response as a bookmark. In an embodiment, selecting the response will save only the response as the bookmark. In an embodiment, the user may be given a choice of which (or both) of the query and response to save as the bookmark.

In an embodiment, the user bookmark controller may be located at a location that is remote from the server/shared bookmark controller. In this embodiment, the user bookmark controller may be on a personal computing device, which may be desktop, laptop, tablet, smartphone, or some other device. The personal computing device may be distinct and separate from the server housing the shared bookmark controller.

A method of sharing bookmarks is provided. The method may include storing a plurality of bookmarks at a database. The database may be on server. The server may be centralized or distributed.

Each bookmark may include queries to a chatbot regarding different topics and roles. For example, a topic may be mortgages, and a role may be a mortgage broker. All bookmarks related to the topic of mortgages may be categorized as belonging to that topic and to that role. A role may be an employee's responsibilities, such as internal human resources, customer support, customer support in a specific department, internal IT support. An employee may be assigned a role during onboarding. An employee may be assigned a role when the employee is promoted or transferred, or otherwise changes roles. Although not as common, customers may be assigned roles as well. For example, if a customer has a specific type of account with a financial institution (e.g., a checking account, a brokerage account, or a mortgage account), the customer may be assessed as belonging to a role associated with that account.

The method may include monitoring a user's queries to the chatbot. A server may monitor the queries. A shared bookmark controller on the server may monitor the queries. A different application may monitor the queries. The user may be an employee or a customer. The chatbot may be external or internal. When two or more of the user's queries to the chatbot are regarding a single topic, the method may include identifying bookmark(s) corresponding to that single topic, and sending the stored bookmarks corresponding to that single topic to the user. For example, if a customer asks twice about savings account interest rates, the shared bookmark controller may email a bookmark with that query, or other bookmarks regarding that topic, to the customer. Similarly, if an employee asks how to perform an action twice, the employee may be sent a bookmark or bookmarks regarding that specific topic.

In an embodiment, the roles available (and the corresponding bookmarks may be pre-determined. A user or administrator may pre-determine the roles. When the user is assigned a role from the available roles (by an administrator), the method may include identifying stored bookmark(s) corresponding to the role, and sending the stored bookmarks corresponding to the role to the user. For example, if a user is a customer service employee in the mortgage department, when the user is training or onboarding at the company, the employee may be sent all saved bookmarks containing common customer questions about mortgages. Doing so may help train the employee, as well as make the employee more efficient and productive.

In an embodiment, the steps of monitoring, identifying, and sending are performed by a shared bookmark controller running on a processor included in a server. In other embodiments, other applications may perform one or all of the steps.

In an embodiment, the stored bookmarks corresponding to the single topic may be sent to a graphical user interface included with the chatbot.

In an embodiment, the shared bookmark controller may include an artificial intelligence/machine ("AI/ML") learning algorithm or algorithms. Any suitable type of AI/ML algorithm may be used. The AI/ML algorithm may generate the stored bookmarks by reviewing past inquiries and past history of various users. The AI/ML algorithm may categorize the bookmarks into topics and roles by reviewing the contents of each bookmark as well as past historical interactions and training data. The AI/ML algorithm may push and send bookmark(s) to users without any prompting by an administrator or other user. For example, if an employee is starting training (for a new role or as a brand-new employee), the AI/ML algorithm may automatically send the appropriate bookmarks for the training.

In an embodiment, the method may include collating the stored bookmarks corresponding to the single topic and corresponding to a role into a collection and sending the entire collection to the user, instead of single bookmarks. In an embodiment, an AI/ML algorithm may collate the stored bookmarks by reviewing the contents of each bookmark as well as historical interactions and training data.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows an illustrative block diagram of apparatus 100 that includes a server 101. Server 101 may alternatively be referred to herein as a "computing device." Elements of apparatus 100, including server 101, may be used to implement various aspects of the apparatus and methods disclosed herein. A "user" of apparatus 100 or server 101 may include other computer systems or servers, or a human.

Server 101 may have a microprocessor 103 for controlling the operation of the device and its associated components, and may include RAM 105, ROM 107, input/output module 109, and a memory 115. The microprocessor 103 may also execute all software running on the server 101—e.g., the operating system 117 and applications 119 such as the bookmark controllers and any security protocols. Other components commonly used for computers, such as EEPROM or Flash memory or any other suitable components, may also be part of the server 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as the bookmark controllers) along with any other data 111 (e.g., historical interactions of a user with a software application) needed for the operation of the apparatus 100. Memory 115 may also store various bookmarks of multiple users. The bookmarks may also be stored in cache memory, or any other suitable memory. Alternatively, some or all of computer executable instructions (alternatively referred to as "code") may be embodied in hardware or firmware (not shown). The microprocessor 103 may execute the instructions embodied by the software and code to perform various functions.

In an embodiment of the server 101, the microprocessor 103 may execute the instructions in all or some of the operating system 117, any applications 119 in the memory 115, any other code necessary to perform the functions in this disclosure, and any other code embodied in hardware or firmware (not shown).

An input/output ("I1O") module 109 may include connectivity to a keyboard, monitor, microphone or network interface through which higher hierarchal server or a user of server 101 may provide input. The input may include input relating to cursor movement. The input/output module 109 may also include one or more speakers for providing audio output and a video display device, such as an LED screen and/or touchscreen, for providing textual, audio, audiovisual, and/or graphical output (not shown).

Apparatus 100 may be connected to other systems, personal computing devices, computers, servers, and/or the Internet 131 via a local area network (LAN) interface 113.

Apparatus 100 may operate in a networked environment supporting connections to one or more remote computers and servers (e.g., personal computing devices), such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computing devices or servers that include many or all of the elements described above relative to apparatus 100. The network connections depicted in FIG. 1 include a local area network (LAN) 125 and a wide area network (WAN) 129 but may also include other networks. Server 101 may include a network interface controller (not shown), which may include a modem 127 and LAN interface or adapter 113, as well as other components and adapters (not shown). When used in a LAN networking environment, server 101 is connected to LAN 125 through a LAN interface or adapter 113. When used in a WAN networking environment, server 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for invoking user functionality related to performing various tasks. In an embodiment, application program(s) 119 may be cloud-based applications. In an embodiment, application program(s) 119 may be bookmark controllers and/or a security protocol. The various tasks may be related to sharing bookmarks among various users of various software applications.

Server 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, or any other suitable device for receiving, storing, transmitting and/or displaying relevant information. Terminal 151 and/or terminal 141 may be other devices such as remote servers. The terminals 151 and/or 141 may be computers where the user is interacting with the application that can use the saved bookmarks.

Any information described above in connection with data 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
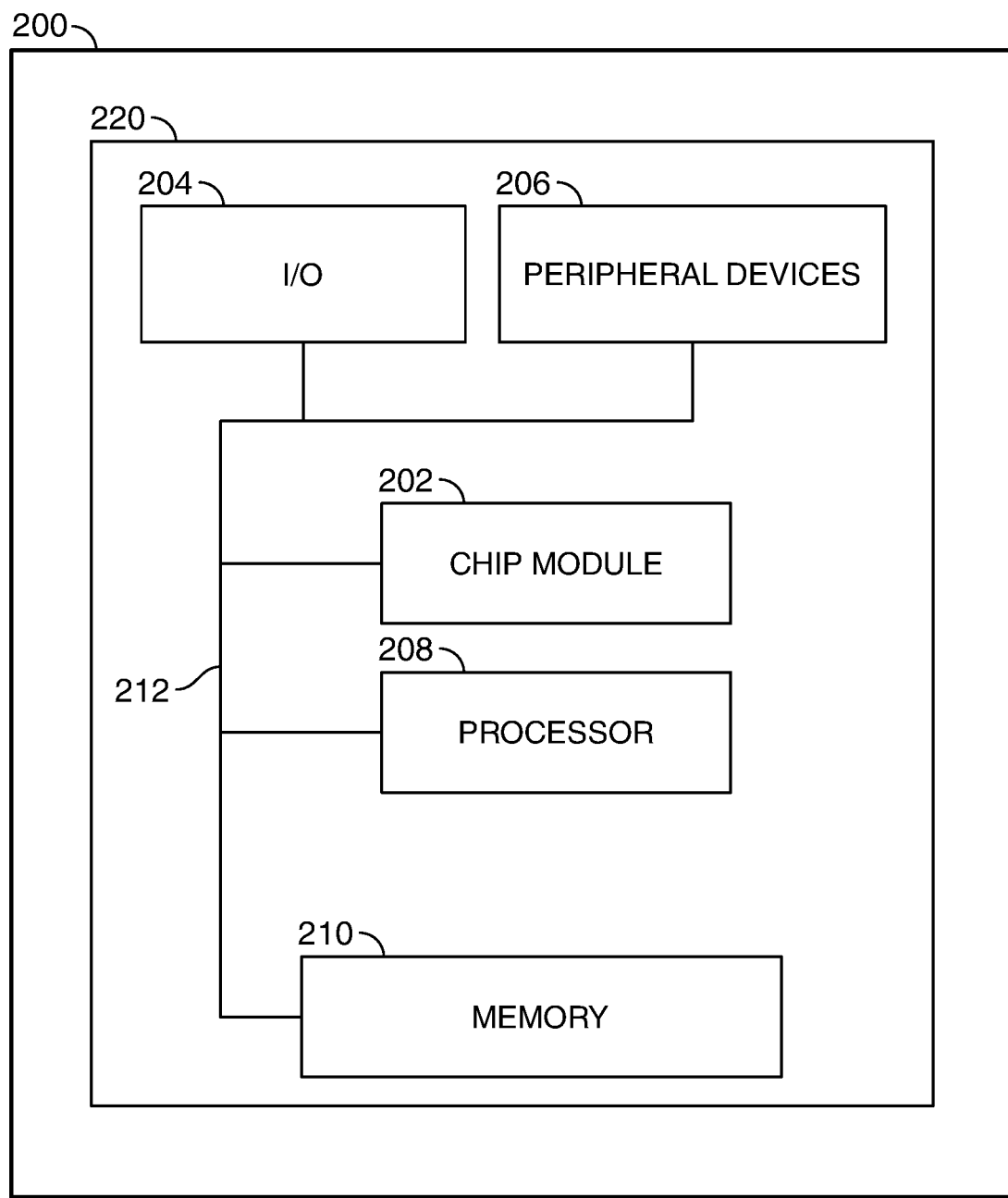
FIG. 2 shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1 and 3. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an LED screen, a touchscreen or any other suitable media or devices; applications 206; logical processing device 208, which may compute data information and structural parameters of various applications 206; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
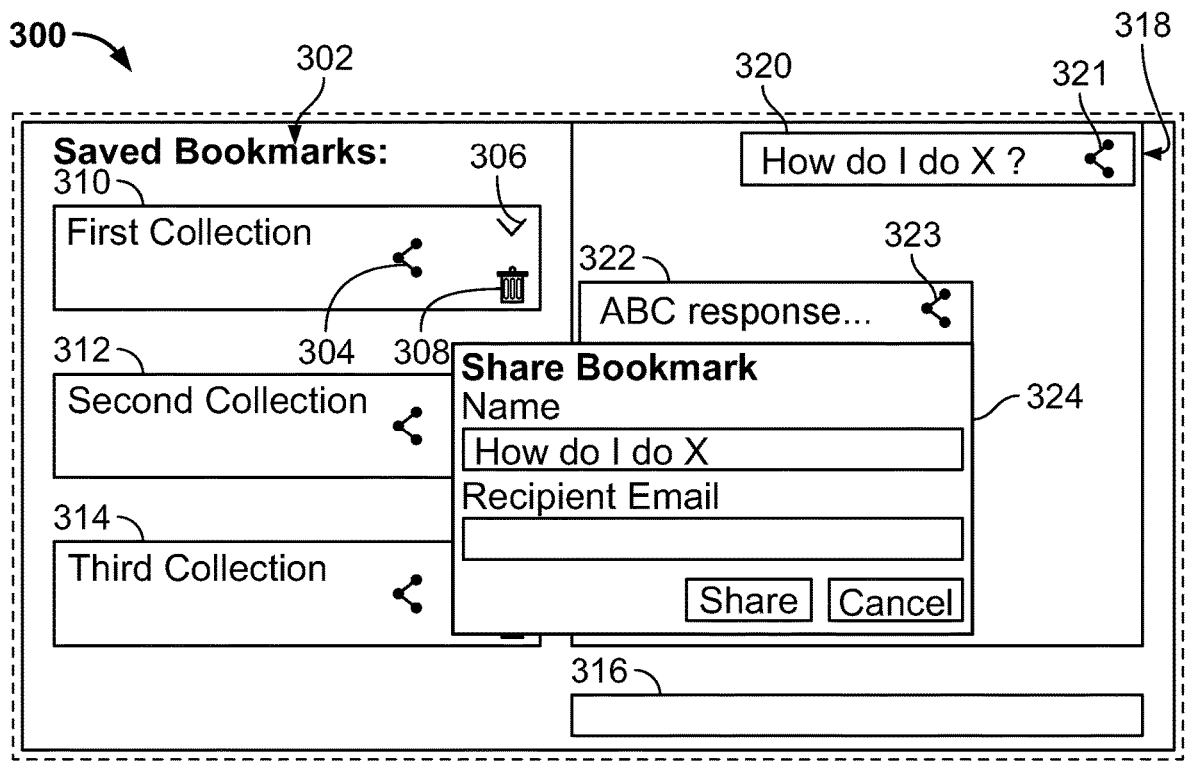
FIG. 3 shows an illustrative embodiment in accordance with principles of the disclosure.

FIG. 3 shows an illustrative embodiment in accordance with principles of the disclosure. A graphical user interface/screen 300 my include a chatbot section 318 along with a saved bookmarks section 302. A user may type a query 320 into text box 316, which may appear on the screen as part of the chatbot 318 conversation. The chatbot's response 322 may appear below the query 320. The query 320 representation may include a selectable share icon 321. The response 322 may also include a selectable share icon 323. Other icons (such as a save icon) are not shown).

The saved bookmarks 302 may include a list of bookmarks, such as a first collection 310, second collection 312, and third collection 314. Each of the collections or bookmarks may include a drop down icon 306, a share icon 304, and a discard icon 308. Other icons may be used and are not shown.

When a user selects a share icon, a dialog screen 324 may appear. The dialog screen 324 may include the name of the bookmark (or collection) that is being shared, along with a box for the user to input the recipient's email address. The dialog screen 324 may also include a share button and a cancel button. FIG. 3 displays a possible embodiment of a graphical user interface. Other embodiments may be used.

Figure 4:
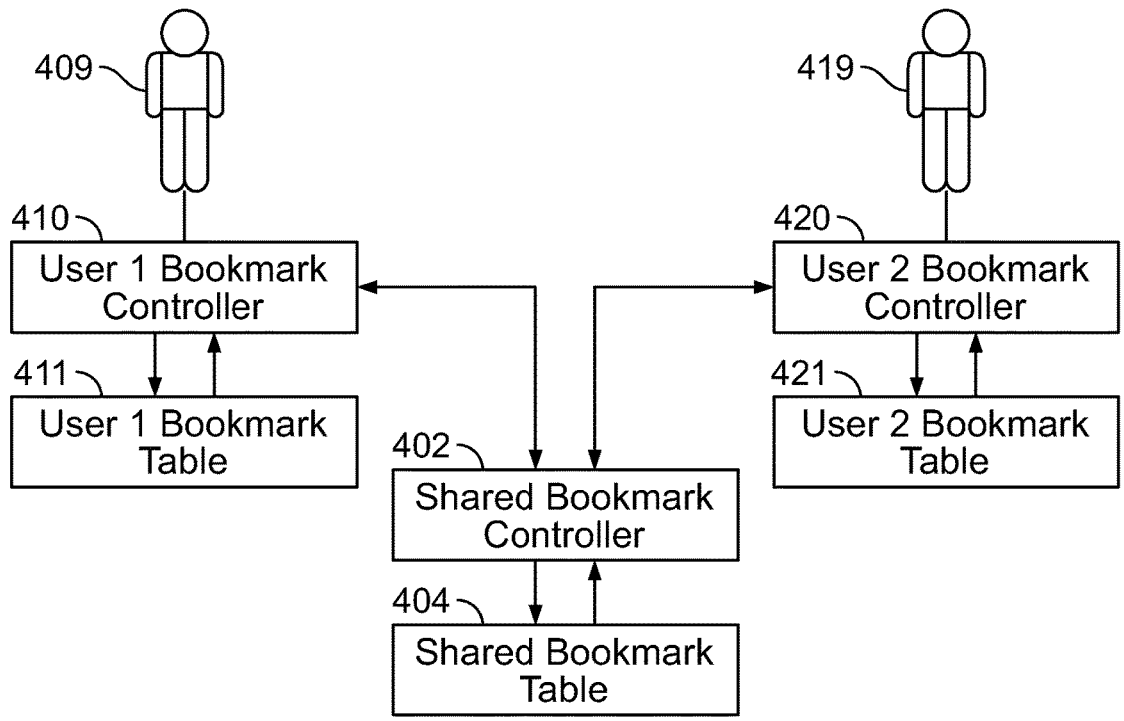
FIG. 4 shows an illustrative diagram in accordance with principles of the disclosure.

FIG. 4 shows an illustrative diagram in accordance with principles of the disclosure. A first user 409 may interact with a user bookmark controller 410 specific to the first user 409. The first user's bookmark controller 410 may save bookmarks into a bookmark table 411 unique to the first user. The first user's bookmark controller 410 may communicate with a shared bookmark controller (on a server) 402. The shared bookmark controller may save bookmarks into a shared bookmark table 404, which may be located on the same server as the shared bookmark controller 402, or a different server.

Similarly, a second user 419 may interact with a user bookmark controller 420 specific to the second user 419. The second user's bookmark controller 420 may save bookmarks into a bookmark table 421 unique to the second user. The second user's bookmark controller 420 may also communicate with the shared bookmark controller (on a server) 402. The second user 419 may have zero access to the first user's 409 bookmark controller 410 or bookmark table 411.

Additional users may be added as necessary, each with their own bookmark controller and bookmark table.

Figure 5:
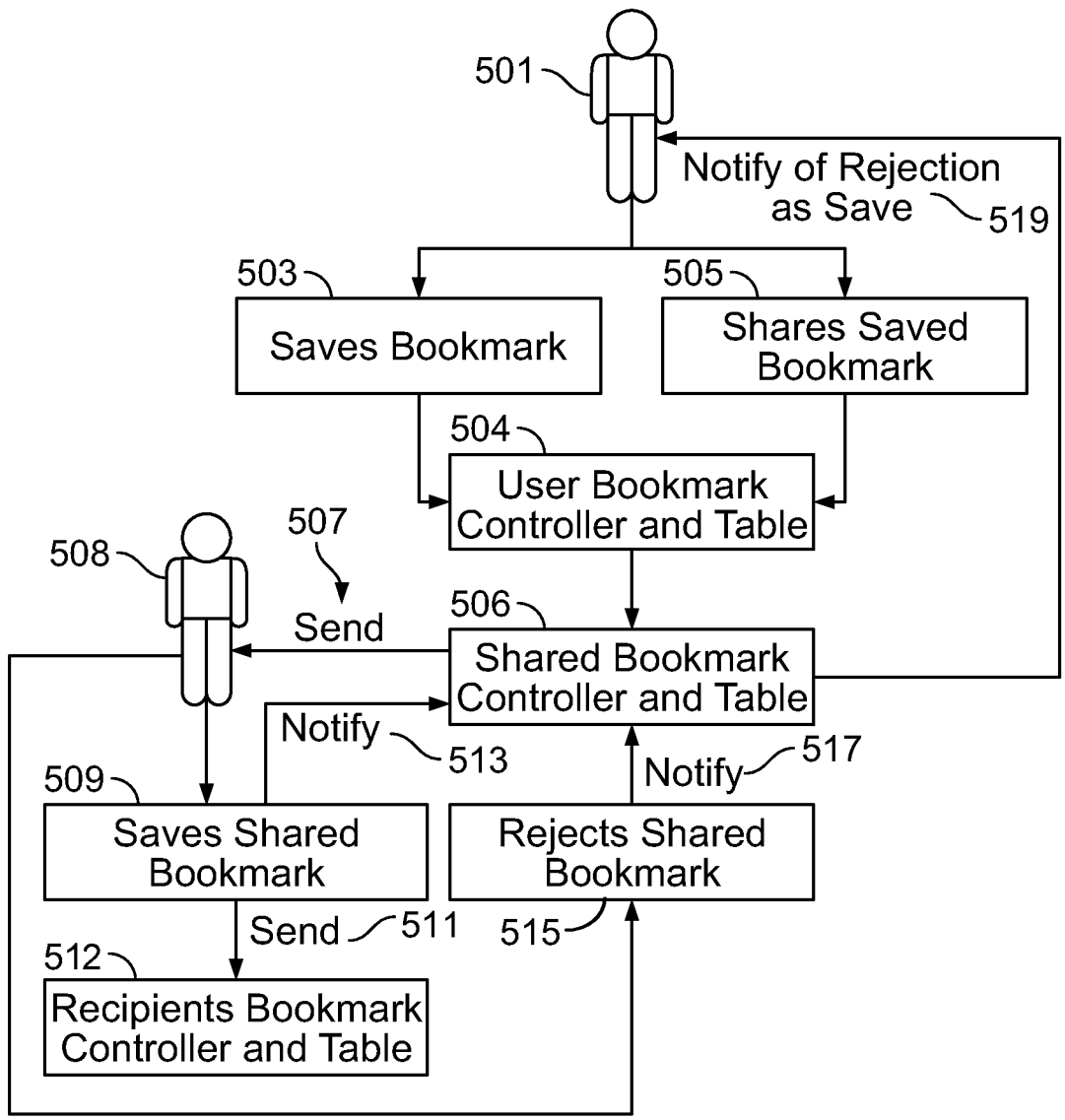
FIG. 5 shows an illustrative diagram in accordance with principles of the disclosure.

FIG. 5 shows an illustrative diagram and flowchart in accordance with principles of the disclosure. Methods may include some or all of the (generally odd numbered) method steps 503-519 and (generally even numbered) apparatus numbered 504-512. Methods may include the steps illustrated in FIG. 5 in an order different from the illustrated order. The illustrative method shown in FIG. 5 may include one or more steps performed in other figures or described herein. Steps and apparatus 503 through 519 may be performed on the apparatus shown in FIGS. 1-4, or other apparatus.

A first user 501 may save a bookmark 503 and share the saved bookmark 505. Both the saved bookmark 503 and shared bookmark 505 may be done through a user bookmark controller and table 504. The user bookmark controller and table may communicate with a shared bookmark controller and table 506. The shared bookmark controller and table may send 507 the shared bookmark 505 to a recipient 508. The recipient 508 may save the shared bookmark at step 509 by sending 511 it to the recipient's bookmark controller and table 512. Saving it at 509 may also notify the shared bookmark controller 506 at step 513. The recipient 508 may also reject the shared bookmark at step 515. A rejection at step 515 may notify the shared bookmark controller 506 at step 517. The shared bookmark controller and table 506 may notify the sender, first user 501 of the rejection or save at step 519.

Figure 6:
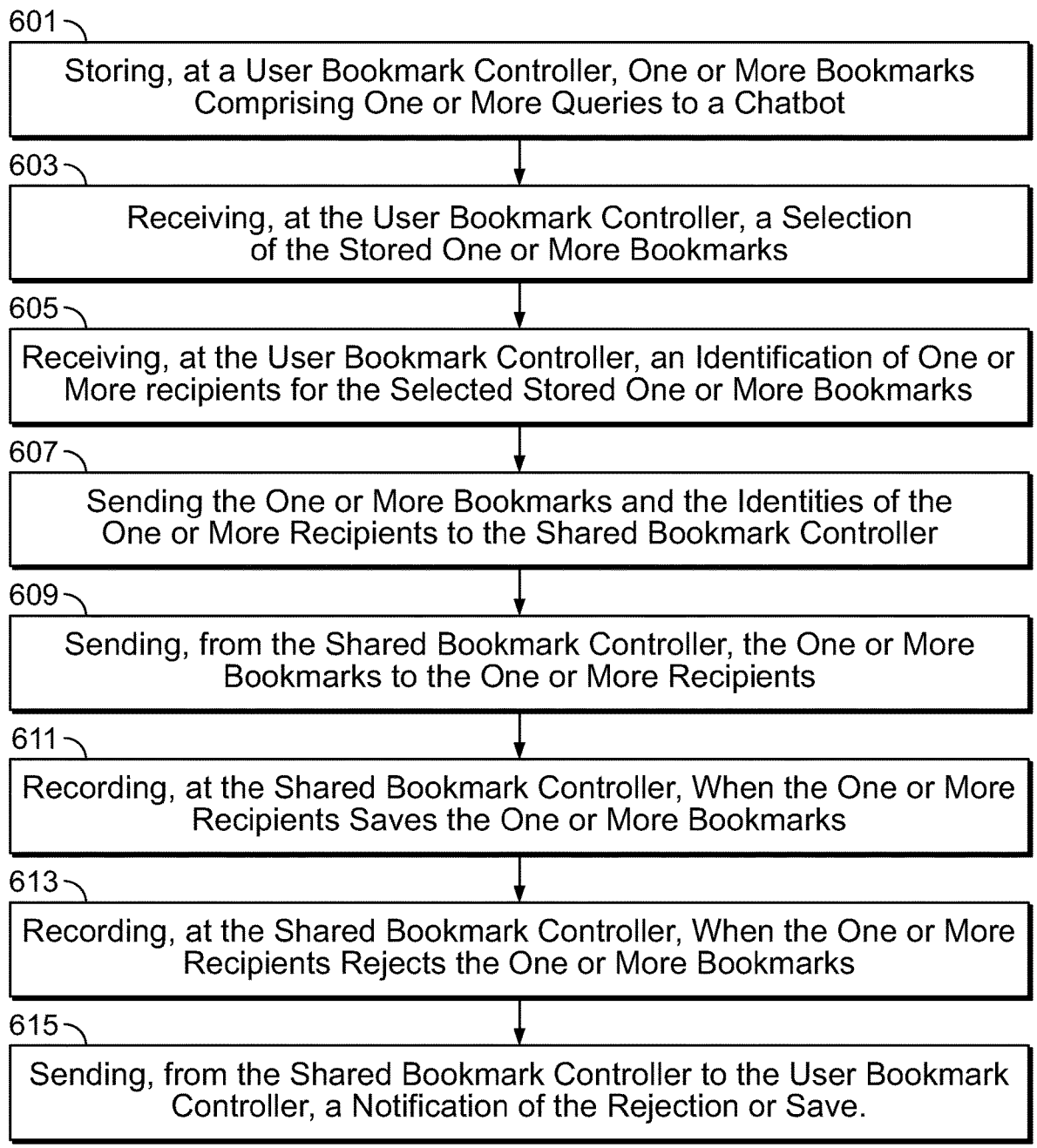
FIG. 6 shows an illustrative flowchart in accordance with principles of the disclosure.

FIG. 6 shows an illustrative flowchart in accordance with principles of the disclosure. Methods may include some or all of the method steps numbered 601 through 615. Methods may include the steps illustrated in FIG. 6 in an order different from the illustrated order. The illustrative method shown in FIG. 6 may include one or more steps performed in other figures or described herein. Steps 601 through 615 may be performed on the apparatus shown in FIGS. 1-4, or other apparatus.

At step 601, a user bookmark controller may store one or more bookmarks. The bookmarks may include one or more queries to a chatbot, or other interactions with a software application. A user may select which query to save, or in an embodiment, an AI/ML algorithm may create (or choose) and save the queries as bookmarks. At step 603, the user bookmark controller may receive a selection, by a user, of one or more of the saved bookmarks, in order to share the selected bookmarks. At step 605, the user may identify a recipient for the shared bookmark(s) and the user bookmark controller may receive that identification. In an embodiment, the user may identify the recipient(s) by inputting the recipient's email address.

At step 607, the user bookmark controller may send the bookmark(s) to be shared along with the recipient's names or email addresses to a shared bookmark controller. The shared bookmark controller may be on a server. The server may be centralized or distributed.

At step 609, the shared bookmark controller may send the shared bookmark(s) to the identified recipient(s) via email, text message, or in an application notification.

At steps 611 and 613, the shared bookmark controller may record if and when the recipient(s) save or reject the bookmark(s). And at step 615, the shared bookmark controller may notify the user bookmark controller if and when the shared bookmark(s) were saved or rejected.

Figure 7:
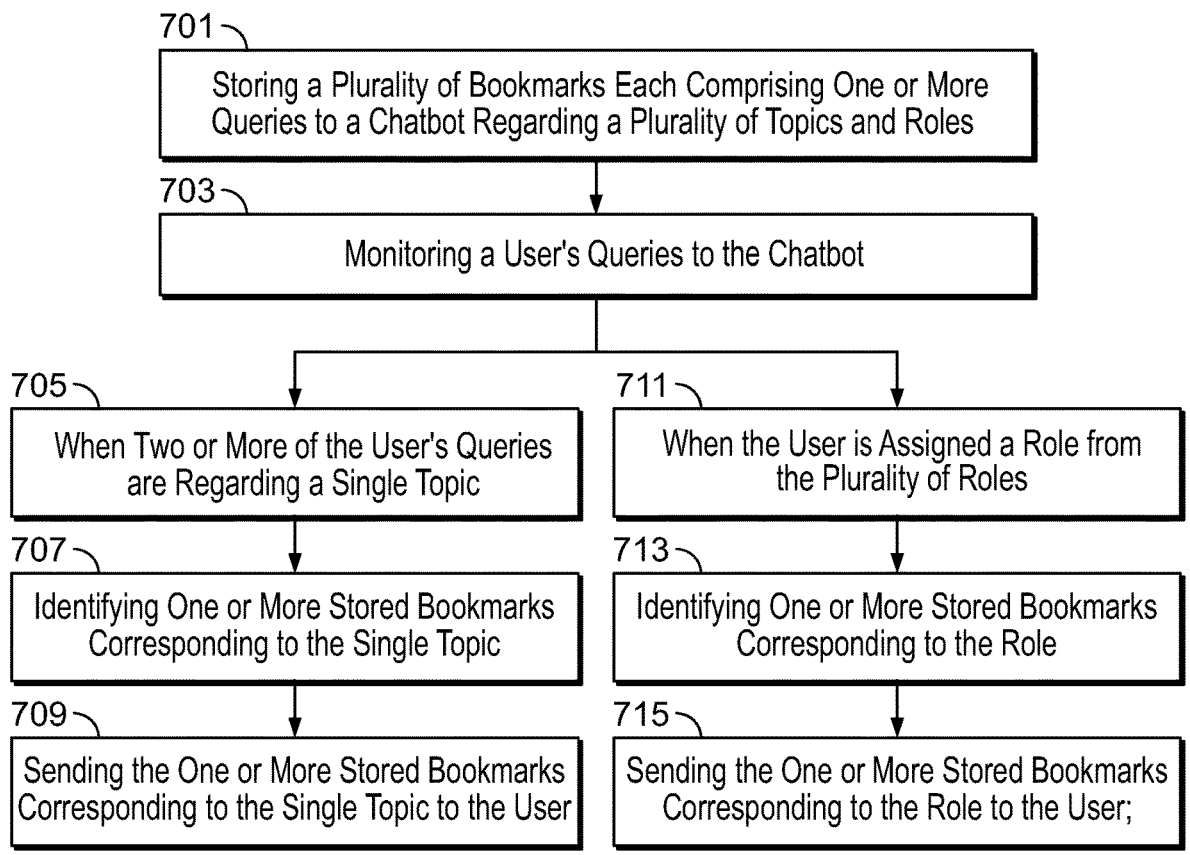
FIG. 7 shows an illustrative flowchart in accordance with principles of the disclosure.

FIG. 7 shows an illustrative flowchart in accordance with principles of the disclosure. Methods may include some or all of the method steps numbered 701 through 715. Methods may include the steps illustrated in FIG. 7 in an order different from the illustrated order. The illustrative method shown in FIG. 7 may include one or more steps performed in other figures or described herein. Steps 701 through 715 may be performed on the apparatus shown in FIGS. 1-4, or other apparatus.

At step 701, a plurality of bookmarks regarding a plurality of topics and roles may be stored. Each bookmark may include a query to a chatbot or other interaction with a software application. At step 703, a shared bookmark controller on a server (centralized or distributed) may monitor a user's queries to the chatbot. In an embodiment, the shared bookmark controller may utilize an AI/ML algorithm to monitor the user's queries.

At step 705, when the shared bookmark controller detects that two or more of the user's queries are regarding a single topic, the shared bookmark controller may identify a bookmark or bookmarks regarding that topic at step 707 and send those bookmark(s) to the user at step 709.

At step 711, when the shared bookmark controller learns that the user has been assigned a role from the list of roles, it may identify a bookmark or bookmarks corresponding to that role at step 713 and send those bookmark(s) to the user at step 715.

The bookmarks may be categorized and collated into categories and groups. Instead of sending single bookmarks, entire categories and groups may be sent to a recipient.

Thus, apparatus and methods for bookmark sharing are provided. Persons skilled in the art will appreciate that the present invention can be practiced by other than the described embodiments, which are presented for purposes of illustration rather than of limitation.

What is claimed is:

1. An apparatus for sharing bookmarks, the apparatus comprising:
    a server, the server comprising:
        a server communication link;
        a server processor;
        a server non-transitory memory configured to store at least:
            a server operating system;
            one or more bookmarks; and
            a shared bookmark controller that runs on the processor and is configured to:
                store the one or more bookmarks;
                add metadata to the one or more bookmarks;
                send the one or more bookmarks to a recipient; and
                record when the recipient saves the one or more bookmarks; and
    a personal computing device, the personal computing device comprising:
        a device communication link;
        a device processor;
        a device non-transitory memory configured to store at least:
            a device operating system; and
            a user bookmark controller that runs on the processor and is configured to:
                permit a user of the personal computing device to save one or more bookmarks to the non-transitory memory;
                permit the user to select the saved one or more bookmarks;
                permit the user to share the selected one or more bookmarks with the shared bookmark controller;

permit the user to select the recipient of the shared one or more bookmarks;
permit the user to assign each of the saved one or more bookmarks to one or more categories;
permit the user to select the one or more categories;
permit the user to share the selected one or more categories with the shared bookmark controller; and
permit the user to select the recipient of the shared one or more categories:

wherein:
the one or more bookmarks comprises a query to a chatbot;
the one or more bookmarks is formed by the user selecting a response to the query from the chatbot;
each of the one or more categories comprises two or more bookmarks; and
when the recipient selects the bookmark, the query to the chatbot is auto populated.

2. The apparatus of claim 1 wherein the query comprises a sequence of keystrokes.

3. The apparatus of claim 1 wherein the server and shared bookmark controller is distributed across multiple servers.

4. The apparatus of claim 1 wherein the one or more bookmarks further comprises the response to the query.

5. The apparatus of claim 1 wherein the query is an audio query.

6. The apparatus of claim 1 wherein the user bookmark controller is further configured to provide a predictive search function to the user, and the predictive search function is linked to a directory including all possible recipients.

7. The apparatus of claim 1 wherein the user bookmark controller is further configured to insert a graphical user interface into the chatbot.

8. The apparatus of claim 1 wherein the metadata comprises:
an identity of the user;
a time when the user created the one or more bookmarks;
a location where the user created the one or more bookmarks;
a title of the one or more bookmarks; and
a category of the one or more bookmarks.

9. A method for sharing bookmarks, the method comprising:
storing, at a user bookmark controller, one or more bookmarks each comprising an interaction with a software program;
categorizing, at the user bookmark controller, the one or more bookmarks into one or more categories;
receiving, at the user bookmark controller, a selection of the stored one or more bookmarks and a selection of one or more categories;
receiving, at the user bookmark controller, an identification of one or more recipients for the selected stored one or more bookmarks and selected one or more categories;
sending, from the user bookmark controller, the selected one or more bookmarks, the selected one or more categories, and the identities of the one or more recipients to a shared bookmark controller;
sending, from the shared bookmark controller, the selected one or more bookmarks and the selected one or more categories to the one or more recipients; and
recording, at the shared bookmark controller, when the one or more recipients saves the selected one or more bookmarks and the selected one or more categories.

10. The method of claim 9 wherein the interaction with a software program comprises a series of keystrokes.

11. The method of claim 10 further comprising, adding, at the shared bookmark controller, metadata comprising:
an identity of a user sending the one or more bookmarks;
a time when the user created the one or more bookmarks;
a location where the user created the one or more bookmarks;
a title of the one or more bookmarks; and
a category of the one or more bookmarks.

12. The method of claim 9, wherein the interaction with a software program comprises a query to a chatbot.

13. The method of claim 9 further comprising:
recording, at the shared bookmark controller, when the one or more recipients rejects the one or more bookmarks; and
sending, from the shared bookmark controller to the user bookmark controller, a notification of the rejection or save.

14. The method of claim 13 wherein the user bookmark controller is located at a location remote from the shared bookmark controller.

15. A method of sharing bookmarks, the method comprising:
storing a plurality of categories of bookmarks each bookmark comprising one or more queries to a chatbot regarding a plurality of topics and user roles;
monitoring a user's queries to the chatbot;
when two or more of the user's queries are regarding a single topic:
identifying one or more stored categories corresponding to the single topic; and
sending the one or more stored categories corresponding to the single topic to the user; and
when the user is assigned a user role from the plurality of user roles:
identifying one or more stored categories corresponding to the user role; and
sending the one or more stored categories corresponding to the user role to the user;
wherein the monitoring, identifying, and sending are performed by a shared bookmark controller running on a processor included in a server.

16. The method of claim 15 wherein the one or more stored categories corresponding to the single topic are sent to a graphical user interface included with the chatbot.

17. The method of claim 15 wherein the shared bookmark controller includes an artificial intelligence/machine ("AI/ML") learning algorithm.

* * * * *